United States Patent
Barrett et al.

(10) Patent No.: US 9,465,621 B2
(45) Date of Patent: Oct. 11, 2016

(54) PRIORITY ACTIVATION OF METROLOGY DRIVER IN BOOT SEQUENCE

(71) Applicant: Itron, Inc., Liberty Lake, WA (US)

(72) Inventors: Gregory Shane Barrett, Hayesville, NC (US); Malladi Satyanarayana Murty, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 545 days.

(21) Appl. No.: 13/717,555

(22) Filed: Dec. 17, 2012

(65) Prior Publication Data

US 2014/0173264 A1   Jun. 19, 2014

(51) Int. Cl.
  *G06F 9/44* (2006.01)
  *G06F 9/54* (2006.01)

(52) U.S. Cl.
  CPC ........... *G06F 9/4401* (2013.01); *G06F 9/4411* (2013.01); *G06F 9/546* (2013.01)

(58) Field of Classification Search
  CPC ..... G06F 9/546; G06F 9/4401; G06F 9/4411
  See application file for complete search history.

(56) References Cited

U.S. PATENT DOCUMENTS

| | | | |
|---|---|---|---|
| 5,315,235 A | 5/1994 | Atherton et al. | |
| 5,897,607 A | 4/1999 | Jenney et al. | |
| 6,119,260 A * | 9/2000 | Tomisawa et al. | 714/758 |
| 7,461,247 B2 * | 12/2008 | van der Veen et al. | 713/2 |
| 7,583,202 B2 | 9/2009 | Robinson et al. | |
| 8,041,979 B2 * | 10/2011 | Cataldo | G01R 31/31907 370/507 |
| 8,310,370 B1 | 11/2012 | Williams, Jr. et al. | |
| 8,458,449 B2 * | 6/2013 | Preimesberger et al. | 713/1 |
| 8,880,862 B2 * | 11/2014 | Fallon et al. | 713/2 |
| 2009/0158288 A1 * | 6/2009 | Fulton | G06F 9/4881 718/103 |
| 2011/0211593 A1 * | 9/2011 | Pepper | H04L 43/028 370/474 |
| 2011/0213953 A1 | 9/2011 | Challener et al. | |
| 2014/0019384 A1 * | 1/2014 | Hanley | G06Q 50/06 705/412 |

OTHER PUBLICATIONS

NPL1, pp. 1-4: "Kernel Mode Definition", Nov. 30, 2004, The Linux Information Project, Http://www.linfo.org/kernel_mode. html.*
NPL3 "Selecting Between ROM, FASTROM, and FLASH for a Microcontroller" Microcontroller Division Applications; STMicroelectronics 2001 http://www.st.com/web/en/resource/technical/document/application_note/CD00004216.pdf.*
PCT Search Report and Written Opinion mailed May 2, 2014 for PCT application No. PCT/US13/67609, 8 pages.

* cited by examiner

*Primary Examiner* — Kim Huynh
*Assistant Examiner* — Siamak S Hefazi
(74) *Attorney, Agent, or Firm* — Lee & Hayes, PLLC (57) ABSTRACT

The techniques described herein implement an operating system that can reliably process time sensitive information in non real-time manner. Thus, the operating system described herein is capable of processing an instance of time sensitive input during a time period after the instance of time sensitive input is received (e.g., at a future point in time). To accomplish this, the techniques timestamp each instance of time sensitive input when it is received at a device. The techniques then store the timestamped instance of time sensitive input in a temporary queue, and make the timestamped instance available to the operating system at a time period after the time period when it is received, as indicated by the timestamp. Additional techniques described herein prioritize the activation of a driver configured to receive the time sensitive information during a bootup sequence or a reboot sequence.

20 Claims, 6 Drawing Sheets

PRIORITY ACTIVATION OF METROLOGY DRIVER IN BOOT SEQUENCE

BACKGROUND

Conventional devices that collect and process time sensitive information are typically configured with real-time operating systems. A real-time operating system may receive signals indicating that different instances of time sensitive input are available to process. Once available, the real-time operating system is configured to perform near instantaneous, priority-based tasks on each of the different instances of time sensitive input as they become available. The real-time operating system may prioritize the execution of tasks in accordance with an established schedule of tasks and/or interrupts that may reschedule an execution order of tasks.

In some scenarios however, a real-time operating system may be unable to perform a complete set of scheduled tasks on an instance of time sensitive input in a necessary time period. For example, a real-time operating system may be unable to complete the set of scheduled tasks on a first instance of time sensitive input, before the next instance of time sensitive input is received and available for processing. In these scenarios where the real-time operating system experiences processing latency and/or processing overload, the real-time operating system may miss an opportunity to execute the scheduled tasks on the next instance of time sensitive input. This may lead to a loss of time sensitive information that is critical to the functionality being performed by a device on which the real-time operating system is running. Furthermore, an operating system may also be unable to receive and/or process time sensitive information that is received during a time period when a device on which it is operating is booting up or rebooting.

Thus, existing operating systems are unable to reliably receive and process time sensitive information when the operating system is i) experiencing processing latency and/or processing overload, or ii) the operating system is in a boot up process or reboot process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, an operating system that processes data in real-time is unable to reliably process time sensitive information when the operating system experiences processing latency and/or processing overload. For example, an operating system processing data in real-time may lose the ability to process a current instance of time sensitive information that is available for processing if the operating system is still processing a previous instance of time sensitive information (e.g., the operating system falls behind a processing schedule). Additionally, the operating system may be unable to receive time sensitive information from sources (e.g., external sources) while a device on which the operating system is running is implementing a boot sequence or reboot sequence.

This application describes techniques that implement an operating system that can reliably process time sensitive information in non real-time. Thus, the operating system described herein is capable of processing an instance of time sensitive input during a time period after the instance of time sensitive input is received (e.g., at a future point in time). This allows for processing in a most efficient manner and allows the operating system to "catch up" if it falls behind without missing any time sensitive information. To accomplish this, the techniques timestamp each instance of time sensitive input when it is received at a device. The techniques then store the timestamped instance of time sensitive input in a temporary queue, and make the timestamped instance available to the operating system at a time period after the time period when it is received, as indicated by the timestamp.

For purposes of the discussion herein, an operating system configured to process time sensitive information in "non real-time" is configured to process tasks during a time period after a time period defined by a timestamp associated with when the time sensitive information is received. Furthermore, the processing of the tasks scheduled to be executed at a past point in time may be performed in parallel. Thus, the non real-time processing may be referred to as "non-instantaneous," which is opposite to the conventional instantaneous, or real-time, processing discussed above. Moreover, an operating system configured to process time sensitive information in non real-time may be a multi-tasking operating system (e.g., when the operating system processes more than one instance of time sensitive input).

Moreover, as used herein, time sensitive information is data that changes over time. Thus, when processing time sensitive information, it is important for a system (e.g., an operating system) to know that the time sensitive information corresponds to a particular point in time or a particular time period. For example, an energy accumulation calculation may depend on determining a difference between a measured energy use at a first point in time and a measured energy use at a second point in time (e.g., a delta amount). Thus, if an entity wants this energy accumulation calculation performed for a time period defined by the first and second points in time, the system needs to know that time sensitive information was actually registered and/or measured at those times.

While the time sensitive information discussed in this application is explained with respect to metrology data obtained at a metering system, it is understood in the context of this document that the non real-time processing system discussed herein may be configured to process information used in any industry where the information is time sensitive and results do not have to be made available in real-time. For example, in an automobile, time sensitive information may be collected from multiple different sources to determine an output to provide to a driver of the car, such as an estimation of how many miles can be driven before a current tank of gas is likely to run out. The driver of the car most likely does not need to know this information in real-time. Accordingly, the non real-time processing techniques discussed herein may be implemented in a system that calculates how many miles can be driven before a current tank of gas is likely to run out.

Multiple and varied implementations and embodiments are described below, beginning with an "Example Architecture" and an "Example Non Real-Time Processing System" usable to implement the data processing techniques described herein. Next, the application describes an "Example Timing Diagram" that illustrates the non real-time nature of processing data. Following the example timing diagram, the application includes an "Example Method of Transmitting a Data Message," an "Example Method of Receiving and Processing a Data Message in a Non Real-Time Routine," and an "Example Method of Activating the Metrology Driver so it can Receive a Data Message." Finally, the application concludes with a brief "Conclusion." This Overview and the following sections, including the section headings, are merely illustrative implementations and embodiments and should not be construed to limit the scope of the claims.

Example Architecture

Figure 1:
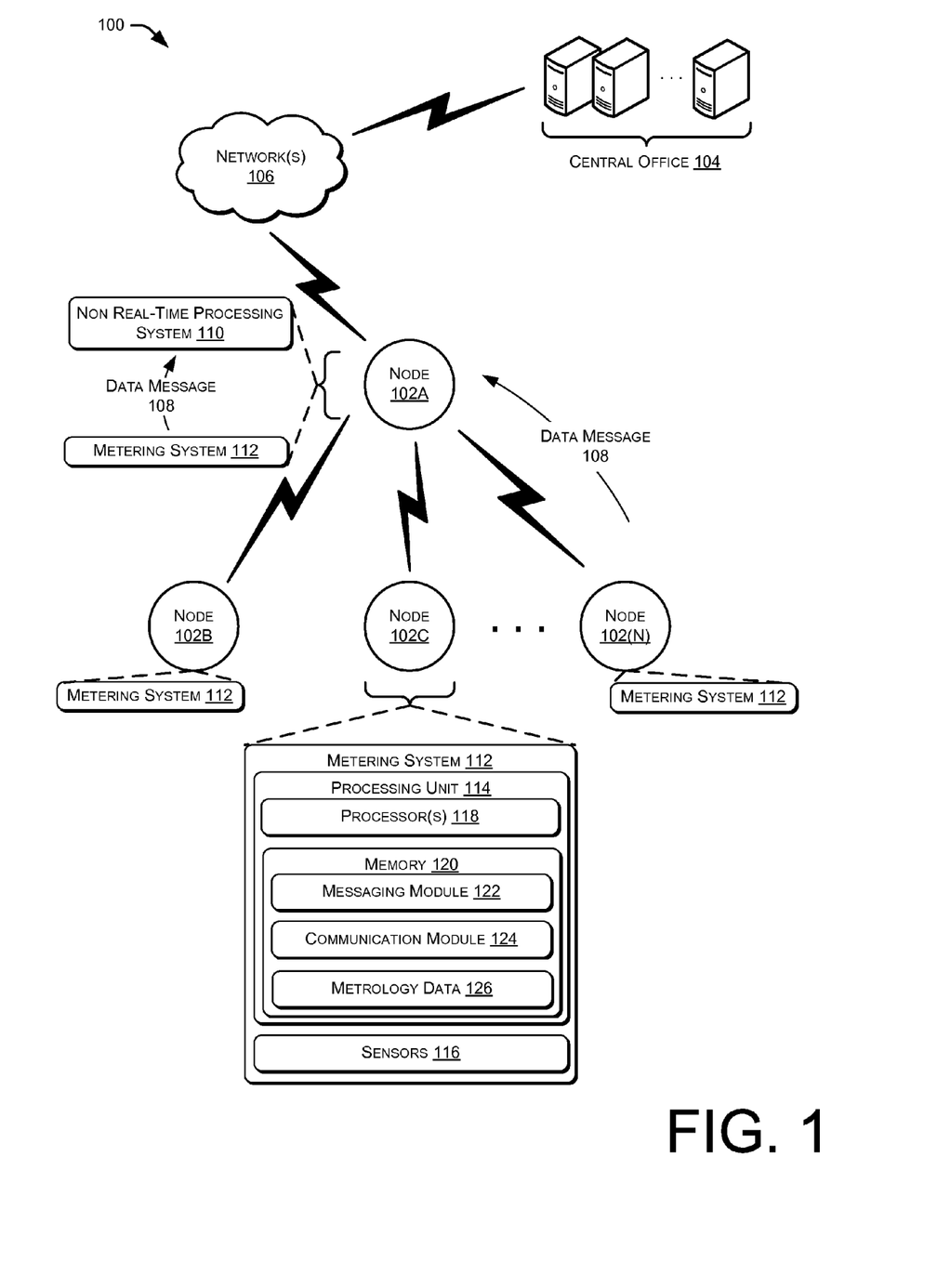
FIG. 1 is a schematic diagram of an example architecture of a multi-node network in which time sensitive information can be collected and processed in non real-time.

FIG. 1 is a schematic diagram of an example architecture 100 of a communication network where time sensitive information can be transmitted and/or received by one or more network communication devices or nodes 102A, 102B, 102C, . . . 102N (collectively referred to as nodes 102) communicatively coupled via communication paths. In this example, N represents a number of nodes in an autonomous routing area (ARA), such as a wide area network (WAN), metropolitan area network (MAN), local area network (LAN), neighborhood area network (NAN), personal area network (PAN), or the like. Each communication path between two nodes may represent a plurality of channels over which a node is able to transmit or receive the time sensitive information.

Each of the nodes 102 may be implemented as any of a variety of devices such as, for example, smart utility meters (e.g., electric, gas, and/or water meters), control devices, transformers, routers, servers, relays (e.g., cellular relays), switches, valves, sensors, combinations of the foregoing, or any device capable of sending and/or receiving time sensitive information.

In this example, at least one node 102A is configured to communicate with a central office 104. Accordingly, node 102A may serve as the connection point for other nodes to a backhaul network(s) 106, such as the Internet. For example, node 102A may serve as an edge deice or root node configured to receive data messages 108 that include time sensitive information from the other nodes (e.g., 102B, 102C, . . . 102N), process the data messages 108 using a non real-time processing system 110, and relay the results of the processing to the central office 104 via the network(s) 106. Components of the non real-time processing system 110 configured to process and manage time sensitive information are further discussed herein with respect to FIG. 2.

In various embodiments, the nodes 102 may be configured as part of a mesh network. In alternative embodiments, the nodes 102 may be configured as part of a "star" network or a mobile and/or handheld network.

The network(s) 106, meanwhile, represents a backhaul network, which may itself comprise a wireless or wired network, or a combination thereof. The network(s) 106 may be a collection of individual networks interconnected with each other and functioning as a single large network (e.g., the Internet or an intranet). Further, the individual networks may be wireless or wired networks, or a combination thereof.

The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, control device, router, regulator, server, relay, switch, valve, and/or other nodes. Although the example of FIG. 1 illustrates the central office 104 in a single location, in some examples the central office may distributed amongst multiple locations and/or may be eliminated entirely (e.g., in the case of a highly decentralized distributed computing platform).

The data messages 108 may be received at node 102A from other nodes with a metering system 112 (e.g., nodes 102B, 102C, . . . 102N), or the data messages may be received at node 102A from a metering system 112 configured in a same physical location as the non real-time processing system 110 (e.g., at node 102A). Thus, a node may include: the metering system 112 and not a non real-time processing system 110, the non real-time processing system 110 and not a metering system 112, or both the metering system 112 and the non real-time processing system 110.

In the example architecture 100, components of the metering system 112 are described with respect to node 102C. The metering system 112 may include a processing unit 114 and one or more sensors 116.

The processing unit 114 may include one or more processor(s) 118 communicatively coupled to memory 120. The memory 120 may be configured to store one or more software and/or firmware modules, which are executable on the processor(s) 118 to implement various functions. In particular, the memory 120 may store a messaging module 122, a communications module 124, and metrology data 126 based on information obtained from, or measured by, the sensors 116.

As further described herein, the metrology data 126 may be data that is obtained as input from one or more sensors 116, or data that is calculated based on input from the one or more sensors 116. Thus, examples of the metrology data 126 may include values that are time sensitive at an individual metering system 112. This time sensitive information may include, but is not limited to, watt hours delivered or received, voltage/amps delivered or received, phase voltage, temperature, load status, flow metrics, load metrics, pressure metrics, etc. Thus, the sensors 116 may include sensors that are common to a metering system 112 which measures and tracks use of electricity or power, use of gas, and/or use of water in an occupied unit (e.g., a residential dwelling unit, a business suite, an individual site, and so forth).

While the modules in the memory 120 are described herein as being software and/or firmware executable on a processor, in other embodiments, any or all of the modules may be implemented in whole or in part by hardware (e.g., as an ASIC, a specialized processing unit, etc.) to execute the described functions.

The memory 120 is an example of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In various embodiments, the messaging module 122 is configured to generate and format data messages 108 for each of the nodes based on the metrology data 126. Accordingly, the messaging module 122 may access one or more values in the metrology data 126 to include in the data message 108 depending on a type of data message the messaging module 122 is configuring to send. Thus, the metering system 112 may be configured to send different types of data messages 108 which include different types of information (e.g., different values). Each type of data message 108 may include one or more fields associated with a particular time sensitive value that the metering system 112 is configured to transmit to a node configured with a non real-time processing system 110. In at least one embodiment, the data message 108 is a blurt message with defined fields populated with values that convey energy accumulation at the metering system 112 (e.g., a standard-type blurt message, an enhanced-type blurt message, an advanced-type blurt message).

In various embodiments, the metering system 112 may be configured to generate and transmit data messages 108 periodically once a defined time interval has elapsed (e.g., one second, two seconds, five seconds, ten seconds, one minute, one hour, and so forth). The defined time interval may be set so that an entity (e.g., central office 104) can reliably manage energy accumulation or energy use at a metering system 112 (e.g., to determine demand, for billing purposes, etc.). In an alternative embodiment, the metering system 112 may transmit data messages 108 in response to a request from node 102A or the central office 104.

In various embodiments, the communications module 124 is configured to communicate the data messages 108 after the messaging module 122 generates the data messages 108. For example, the communications module 124 may be configured to send the data messages 108 to another node using a cellular direct connection, radio frequency (RF) channel communications, power line communication (PLC), a Wi-Fi connection, Zigbee communications, Bluetooth communications, universal serial bus (USB) communications, optical port, Ethernet, radio frequency identification (RFID) communications, near field communications or any other acceptable communications protocol.

Various environments of the example architecture 100 described above may include an apartment building with multiple dwelling units (e.g., the nodes 102), an office building with multiple enterprise suites (e.g., the nodes 102), or a residential neighborhood with multiple houses (e.g., the nodes 102). In these environments, each unit, suite or house has its own metering system 112. Moreover, the apartment or office building may have one or more nodes configured to implement the non real-time processing system 110 (e.g., node 102A). This node may receive and process data messages 108 from other nodes (e.g., node 102B, 102C, . . . 102N), such that partitioned functionality may be performed (e.g., energy accumulation calculations can be performed on separate instances to determine energy use for each unit or suite). Alternatively, each node with a metering system 112 may also be equipped with the non-real time processing system 110 (e.g., each house in the residential neighborhood environment).

Example Non Real-Time Processing System

Figure 2:
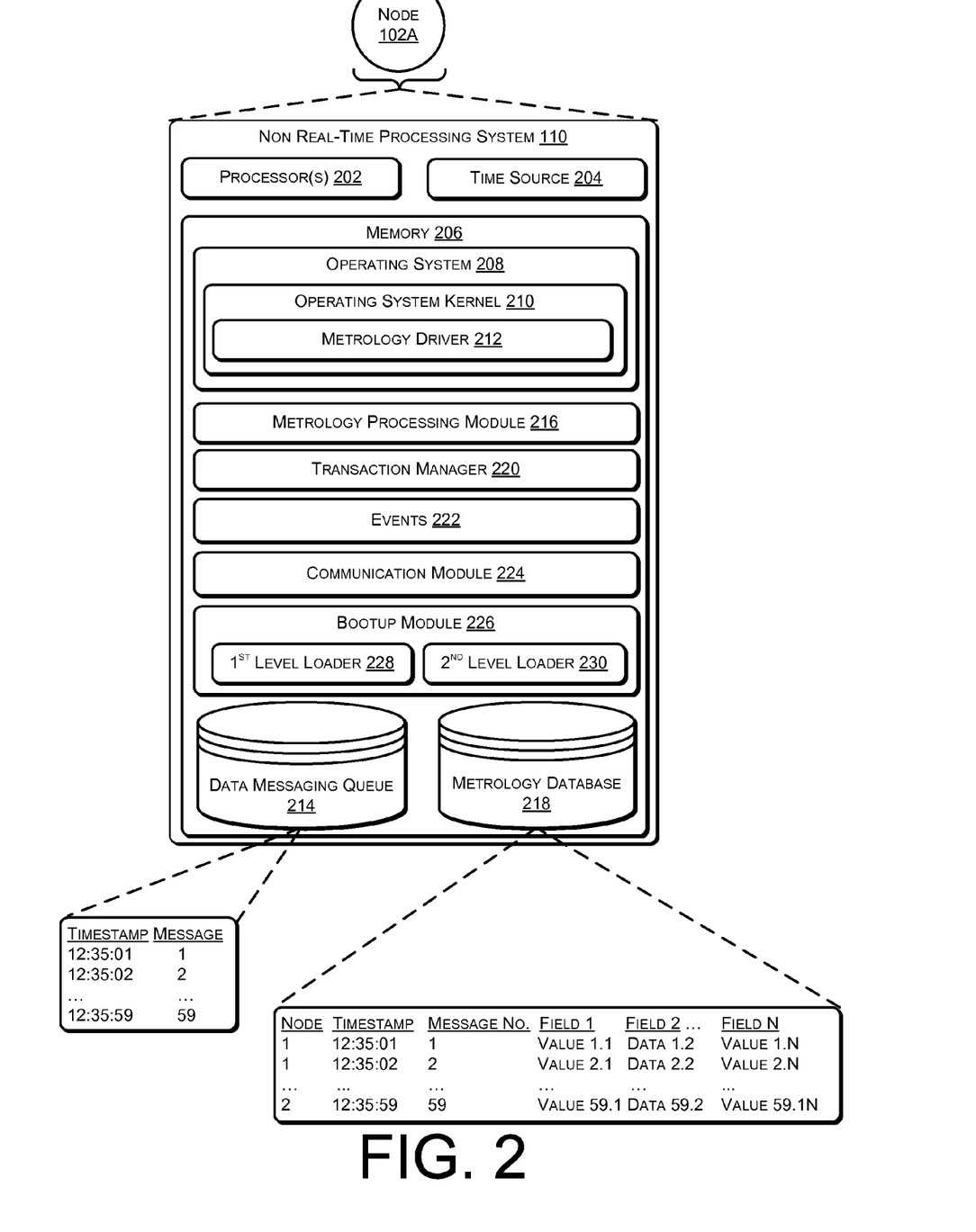
FIG. 2 is a schematic diagram showing components of an example non real-time processing system.

FIG. 2 is a schematic diagram showing components of the non real-time processing system 110 of example node 102A of FIG. 1. As mentioned above with respect to FIG. 1, the non real-time processing system 110 is configured to receive one or more data messages 108 that include time sensitive information from one or more metering systems 112, timestamp the data messages 108, and then process the time sensitive information in a non real-time manner using the timestamps.

Thus, the non real-time processing system 110 may include processor(s) 202, a time source 204, and memory 206. The non real-time processing system 110 may use or access the time source 204 to determine timing information to include in the timestamp. To this end, the non real-time processing system 110 can execute one or more tasks scheduled for a current time at a time in the future by using the timestamped data messages 108. This situation may occur when the non real-time processing system 110 experiences processing delay and/or processing overload due to a large amount of calculations necessary for tasks currently scheduled, or a large number of nodes for which the calculations need to be virtually performed (e.g., the nodes 102 in FIG. 2). This situation may also occur when an application that is assigned to accessing and processing the data messages 108 fails or has to restart (e.g., due to an update installment, reconfiguration, etc.), and therefore, the application is unable to process the data messages 108 as they come in.

Accordingly, by knowing the timing context of when a data message 108 is received and when a particular task is scheduled to be performed on the time sensitive information included in the data message 108, the non real-time processing system 110 can work through periods where it experiences processing delay and/or processing overload by executing the particular task in a non real-time, non-instantaneous manner (e.g., at a future time). This may allow the non real-time processing system 110 to catch up to a point where it may eventually execute subsequent scheduled tasks as the data messages 108 are received.

The processor(s) 202 may include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 202 may be configured to execute each of the components, modules, events, and/or applications stored in the memory 206.

The memory 206 is an example of computer-readable media and may take the form of volatile memory, such as random access memory (RAM) and/or non-volatile memory, such as read only memory (ROM) or flash RAM. Examples of additional computer-readable media are provided above with respect to the description of the memory 120 in FIG. 1.

The memory 206 may include an operating system 208. The operating system 208 comprises an operating system kernel 210 which includes a metrology driver 212. The operating system 208 may be a multi-tasking operating system such as a Linux-based operating system, a Windows-based operating system (e.g., CE), a QNX Neutrino operating system, or any other known non real-time operating system. To this end, the operating system kernel 210 may serve as a bridge between software components (e.g., applications, programs, daemons) and the actual data processing done at a hardware level. Thus, the operating system kernel 210 is configured to manage the resources available to the non real-time processing system 110, so that the non real-time processing system 110 can execute functionality for the software components.

In various embodiments, the metrology driver 212 is configured to capture data messages 108 received from the nodes 102. Thus, the metrology driver 212 may be configured on top of, or to work in conjunction with, an interface that accepts the data messages 108 (e.g., a serial interface such as Universal Async Receiver/Transmitter (UART) interface, tty port, etc.) and sends a signal to the metrology driver 212 indicating that a data message 108 is available. After receiving the data messages 108, the metrology driver 212 may access the time source 204 to determine timing information to associate with the data message 108 in the form of a timestamp. The metrology driver 212 may then store the timestamped data message 108 in a data messaging queue 214. In various embodiments, the data messaging queue 214 is a first-in/first-out (FIFO) temporary queue that removes the timestamped data messages 108 after they are exported or pulled out, as further discussed herein (e.g., the data messaging queue 214 is emptied). In this sense, the data messaging queue 214 will not become overcrowded or unable to handle additional data messages 108 received by the metrology driver 212. Rather, the metrology driver 212 knows that once the timestamped data messages 108 are exported they will be securely and reliably stored elsewhere, and thus, they can be removed from the data messaging queue 214 thereafter.

The example of the data messaging queue 214 illustrated in FIG. 2 shows the timestamp associated with each data message received at the metrology driver 212 (e.g., timestamps 12:35:01, 12:35:02, and 12:35:59 associated with messages 1, 2, up to 59, respectively). While this illustration shows a message for each second and up to a minute's worth of data messages 108, it is understood in the context of this document that the data messaging queue 214 may store an arbitrary number of data messages. For example, each node 102 may be configured to send a data message 108 periodically in accordance with a defined time interval (e.g., one second) and the data messaging queue 214 may be configured to store an hour's worth of data messages 108 or more for each node (i.e., 3600 data messages or more for each node). A set of data messages 108 that are continually received from a single node at a defined time interval may be referred to as a sequential set of data messages 108 from that particular node.

In some embodiments where the non real-time processing system 110 is partitioning data messages 108 from different nodes 102, the metrology driver 212 may also store the timestamp and the data message 108 with a node identification (ID) so that data messages 108 from the different nodes 102 can be distinguished from one another. In further embodiments, the individual node that transmits a data message 108 may also communicate a node ID in the data message 108 for partitioning purposes. In this sense, the non real-time processing system 110 may be configured to partition different data message processing instances (e.g., via a virtual machine) for each node from which it receives the data messages 108.

In some embodiments, the metrology driver 212 may be configured to timestamp the data message 108 with a particular accuracy based on an exact time when a first portion of the data message 108 is first received or after the whole data message 108 has been completely received (e.g., to a nanosecond granularity). In alternative embodiments, the metrology driver 212 may be configured to timestamp the data message 108 at any point in between receiving the first portion of the data message 108 and receiving the whole data message 108. These alternative embodiments may therefore be able to accurately approximate the time interval at which the data message arrives 108 at a higher level granularity (e.g., which second, which three second interval, which ten second interval, and so forth).

In various embodiments, after timestamping the data messages 108 and storing them in the data messaging queue 214, the metrology driver 212 may provide a view of the data messaging queue 214 to any component or process (internal or external to the non real-time processing system 110) requesting to view the data messaging queue 214 or requesting information about the data messaging queue 214 (e.g., a number of data messages 108 contained in the queue, a number of nodes that are sending data messages to the metrology driver 212).

In various embodiments, the metrology driver 212, upon request or in accordance with an established schedule, is configured to open the data messaging queue 214 and export the timestamped data messages 108 from the data messaging queue 214. At least one component that may request a view into the data messaging queue 214 is the metrology processing module 216. The metrology processing module 216 may be configured with logic that knows when (e.g., is aware of a defined schedule) and how to pull the timestamped data messages 108 that include the time sensitive information from the data messaging queue 214. In some embodiments, the metrology processing module 216 may then parse the information in the timestamped data messages 108, validate the information in the timestamped data messages 108 to confirm that the information is not corrupted, and store the information in a metrology database 218 (e.g., a structured query language (SQL) database or other structured database).

The example of the metrology database 218 illustrated in FIG. 2 shows a more detailed view of the stored data messages 108 compared to those stored in the data messaging queue 214. Accordingly, the metrology database 218 provides a structure to the time sensitive information so that the information can be efficiently accessed. For example, a data message 108 in the metrology database 218 may be structured so that multiple columns correspond to which node send the data message (e.g., using the node ID), the timestamp, a message number, and a plurality of fields corresponding to one or more values measured at the metering system 112 or data calculated at the metering system 112 based on the measured values.

In various embodiments, the metrology processing module 216 may view and/or pull the timestamped data messages 108 from the data messaging queue 214 in response to receiving instructions from an upstream module (e.g., application, program, daemon), such as a transaction manager 220. The transaction manager 220 is configured to access a configuration table for the non real-time processing system 110 and determine one or more events 222 (e.g., may be a task or part of a task) that are scheduled to be executed (e.g., referred to as "firing an event") on the non real-time processing system 110 at a particular time. For example, the events 222 may define one or more entry points (e.g., function calls) into a functional library (e.g., shared objects in a dynamic link-library DLL). The scheduled events may be fired in association with one or more applications, programs, or daemons executing particular tasks on the non real-time processing system 110. For example, functions included in the functional library may use the time sensitive information: to perform an energy accumulation calculation, to perform an energy demand calculation, to perform load profiling, to determine a time of use, to determine a voltage quality, to perform a watt power consumption calculation, to determine a direction of flow, and/or perform any other calculation or determination using the time sensitive information obtained by metering system 112.

Accordingly, the transaction manager 220 may receive an indication of a scheduled event 222, create a transaction process that loads the functions or shared objects defined by the event, and then request that the metrology driver 212 pull the timestamped data messages 108 from the data messaging queue 214 so that the time sensitive information contained therein can be moved to the metrology database 218 where it can be accessed and processed. In an alternative embodiment, the time sensitive information may have already been exported from the data messaging queue 214 to the metrology database 218 by the metrology processing module 216 before the indication of the scheduled event 222 is received by the transaction manager 220.

Therefore, as described above and further discussed herein, the non real-time processing system 110 can process the time sensitive information in the data messages 108 in a non real-time manner because it knows a point in time when the data message 108 is received by the metrology driver 212 (e.g., the time the physical metrology data is associated with) and it knows a scheduled time that an event is fired. An example of this may be an event (e.g., an energy accumulation calculation) that is subscribed to data messages 108, and therefore, the event is repeatedly fired so that the energy accumulation calculation is performed periodically on different data messages 108 as they are received (e.g., each metering system 112 may be programmed to send a data message every second, five seconds, ten seconds, and so forth). Ideally, the event may be executed by an operating system at an instance when a data message 108 is received.

However, if the operating system 208 or other component in the non real-time processing system 110 falls behind and is unable to perform all the calculations in the defined time interval (e.g., one second) before it needs to move on to processing the next data message 108, then the operating system 208 may miss out or lose the time sensitive information included in the next data message 108. The techniques discussed herein address this problem by timestamping the data messages 108 so that an event scheduled for a time in the past, can be executed at a current time with the appropriate timestamped information.

In various embodiments, the memory 206 further includes a communications module 224 and a bootup module 226. The communications module 224 is configured to communicate with the central office 104 over networks 106 using one or more of the communications protocols discussed above. Thus, the communications module 224 may receive instructions or information from the central office 104 or may transmit data that has been processed at the non real-time processing system 110.

While the discussion above is associated with processing delay and/or processing overload experienced by the non real-time processing system 110, there is also a possibility that the non real-time processing system 110 may lose or miss out on data messages 108 (e.g., unable to receive data messages) when it is booting up or rebooting the operating system 208 (e.g., due to a power outage, a reconfiguration, update installment, etc.). Accordingly, the bootup module 226 includes a first level loader 228 and a second level loader 230 that are configured to prioritize activation of the metrology driver 212 during a boot sequence or a reboot sequence. The bootup module 226 is further discussed below with respect to FIG. 6.

Example Non Real-Time Timing Diagram

Figure 3:
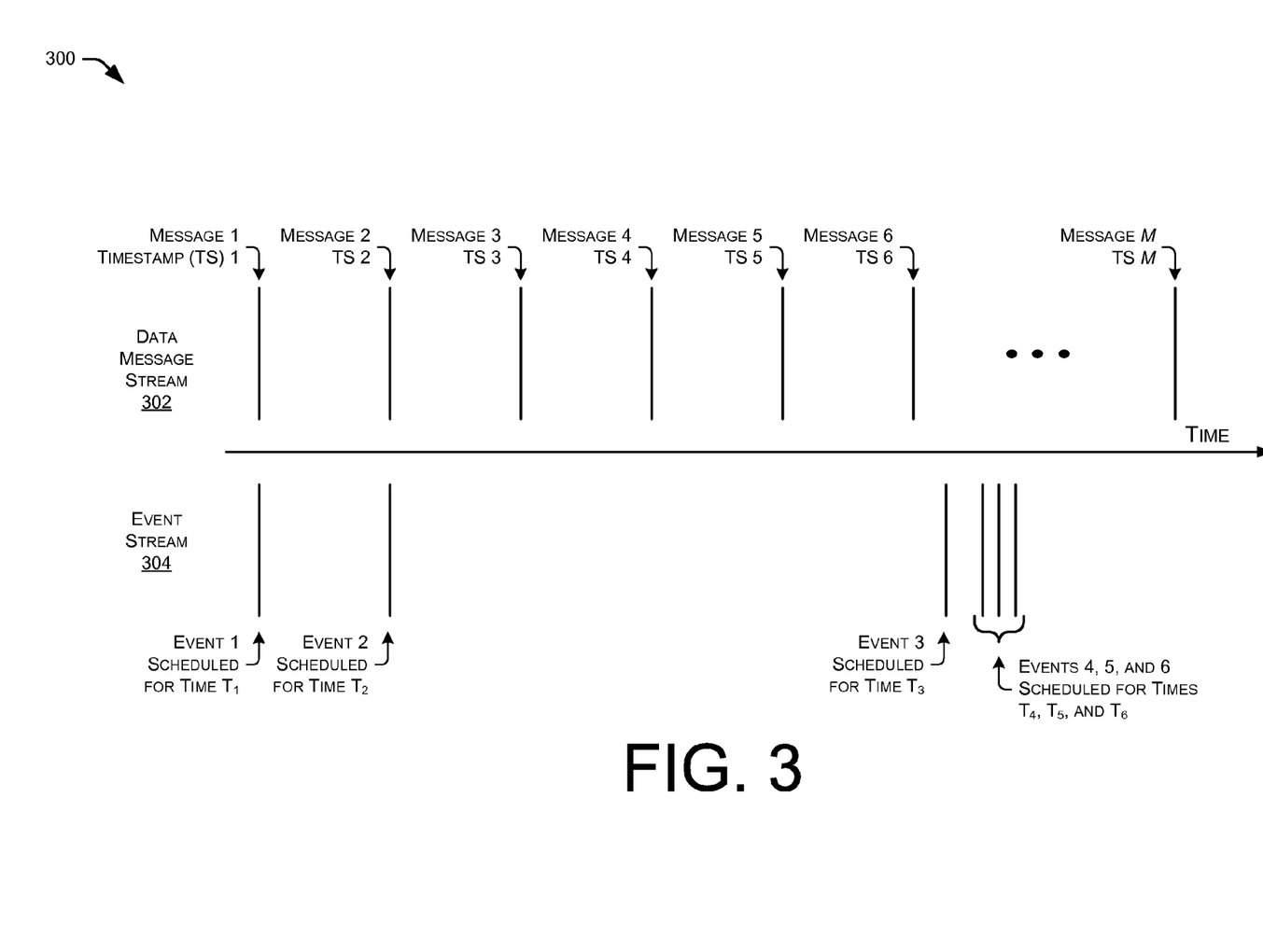
FIG. 3 is an example timing diagram illustrating processing of time sensitive information in non real-time.

FIG. 3 illustrates an example non real-time timing diagram 300. The timing diagram illustrates a data message stream 302 and an event stream 304 separated by a time axis. As shown, the example data messages 108 are represented by a tick mark in the data message stream 302. The data messages 108 are received at periodic intervals and are associated with a timestamp (e.g., data messages 1, 2, 3, . . . M). For discussion purposes, six events are shown in the event stream 304 (e.g., event one scheduled to be executed at time $t_1$, event two scheduled to be executed at time $t_2$, event three scheduled to be executed at time $t_3$, and so forth).

As discussed above, the non real-time processing system 110 may be configured to fire events one through six at a defined time interval associated with when the data messages 108 are received, or expected to be received, in the data message stream 302 (e.g., the events may be assigned or subscribed to the data messages 108). As shown in FIG. 3, the non real-time processing system 110 may initiate execution of event one and event two on schedule (e.g., time $t_1$ is associated with timestamp one of message one and time $t_2$ is associated with timestamp two of message two).

However, the non real-time processing system 110 may experience a processing delay or processing overload while executing event two, such that it is unable to fire or execute i) event three when message three is received (e.g., time $t_3$ is associated with timestamp three), ii) event four when message four is received (e.g., time $t_4$ is associated with timestamp four), iii) event five when message five is received (e.g., time $t_5$ is associated with timestamp five), and iv) event six when message six is received (e.g., time $t_6$ is associated with timestamp six).

Accordingly, the non-real time processing system 110, using the timestamped data messages and the known scheduled times that the events were supposed to be executed, can perform the appropriate processing or calculations for events three through six at a time in the future, in non-real time. For example, the non-real time processing system 110 may have to execute multiple events in a particular time interval when resources become available, such that the non-real time processing system 110 catches up to the currently received data.

While the example timing diagram 300 illustrates that the non-real time processing system 110 is delayed in processing four events (e.g., events three through six) it is understood in the context of this document, that the delay may result in a larger or lesser number of "missed" data messages 108 that are not executed when the data message is received (e.g., data messages three through six in FIG. 3). A number of missed data messages 108 may depend on what causes the delay or overload. Thus, the metrology driver 212 and the data messaging queue 214 is configured to handle and store an arbitrary number of data messages 108 so that the non-real time processing system 110 will not lose an opportunity to process the time sensitive information. The arbitrary number may be a sufficiently safe number that accounts for any type of processing delay or processing overload.

Example Method of Transmitting a Data Message

Figure 4:
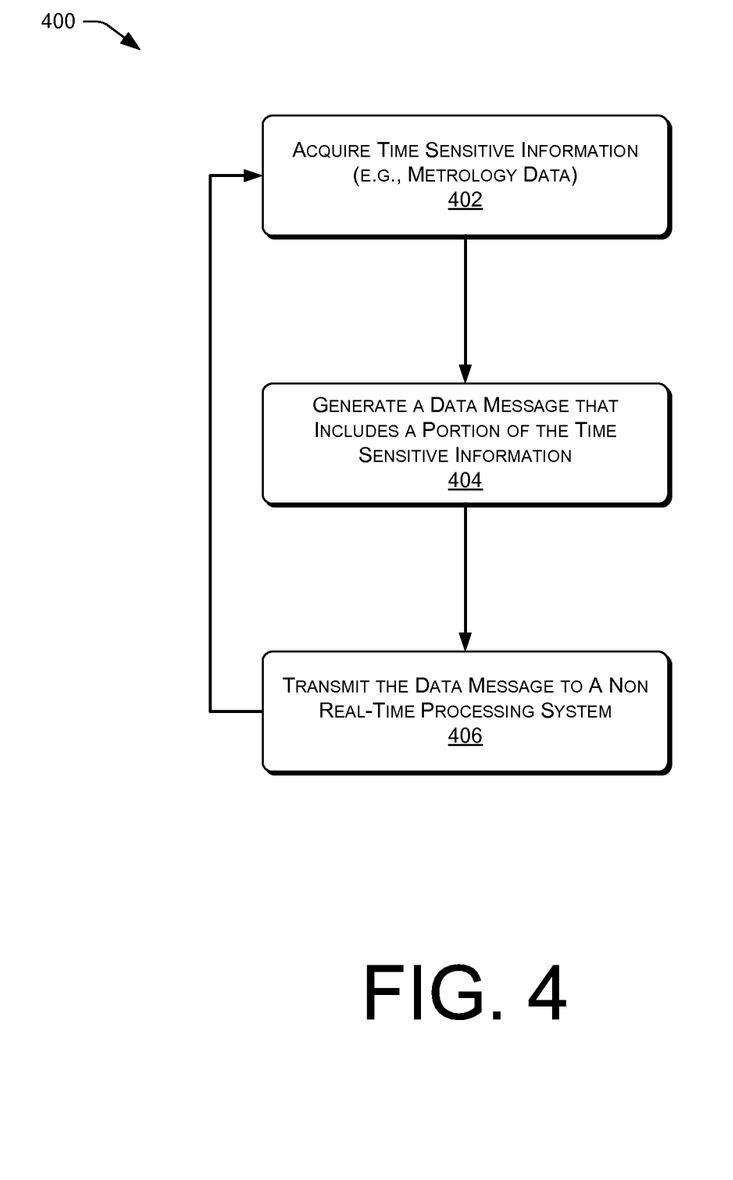
FIG. 4 is a flowchart illustrating an example method, which transmits a data message including time sensitive information to be processed in non real-time.

FIG. 4 illustrates an example method 400 of transmitting a data message 108 from a metering system 112 to a non real-time processing system 110. The method 400 is described with reference to the example architecture 100 depicted in FIG. 1. However, the method 400 is not limited to use with the example architecture 100 and may be implemented using other architectures and/or devices.

At block 402, a node 102 acquires time sensitive information. For example, the time sensitive information may be the metrology data 126 obtained from the one or more sensors 116. The sensors may be configured to continually measure, monitor, and/or calculate, at a particular point in time, values relating to watt hours delivered or received, voltage/amps delivered or received, phase voltage, temperature, load status, flow metrics, load metrics, pressure metrics, energy accumulation, energy demand, load profiling, time of use, voltage quality, watt power consumption, direction of flow, or any other data commonly metered.

At block 404, the messaging module 122 accesses one or more of the values from the metrology data 126 and generates a data message 108 that includes the accessed values. At block 406, the communications module 124 transmits the data message to the non real-time processing system 110 for processing. Moreover, the metering system 112 at nodes 102 may be configured to sequentially generate and send data messages 108 at periodic points in time separated by a defined interval (e.g., every second, five seconds, ten seconds, minute, hour, day, and so forth).

Example Method of Receiving and Processing a Data Message in Non Real-Time

Figure 5:
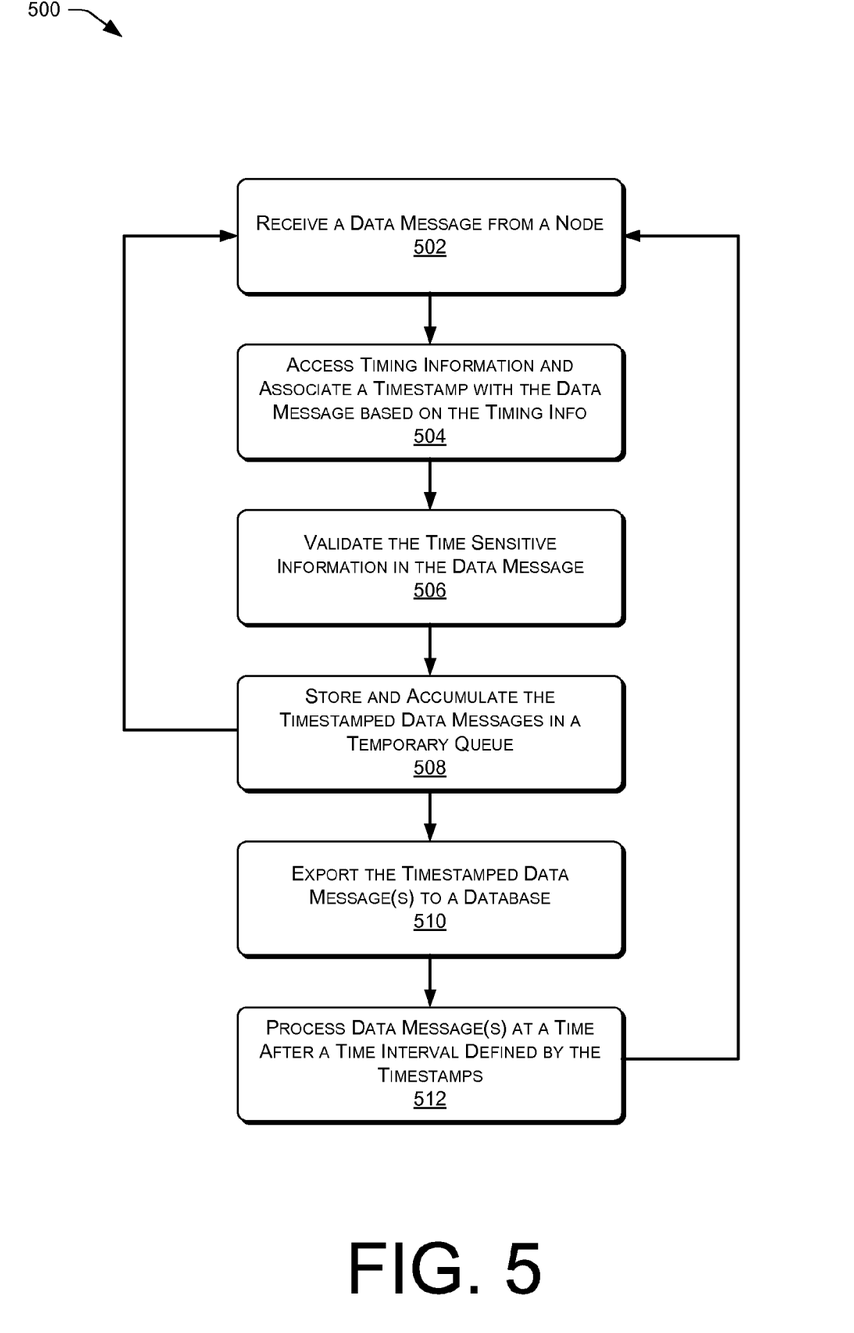
FIG. 5 is a flowchart illustrating an example method, which receives and processes a data message in non real-time.

FIG. 5 illustrates an example method 500 of receiving and processing a data message in non real-time. The method 500 is described with respect to the example architecture 100 of FIG. 1, the example Non Real-Time Processing System of FIG. 2, and/or the example Non-Real Time Timing Diagram of FIG. 3. However, the method 500 is not limited to the embodiments or examples described with respect to FIGS. 1-3 and may be implemented using other architectures and/or devices.

At block 502, the metrology driver 212 receives a data message 108 from one of the nodes 102. In various embodiments, a serial interface such as Universal Async Receiver/Transmitter (UART) interface may send a signal to the metrology driver 212 indicating that the data message 108 has been received.

At block 504, the metrology driver 212 access timing information from a timing source 204 and associates a timestamp with the data message 108 based on the timing information accessed. As discussed above, the timestamp may be "approximately" associated with a particular time interval that the data message 108 is received (e.g., which second, which five second period, which ten second period, and so forth). Moreover, the timing information may define an exact point in time (e.g., up to a nanosecond granularity) when a first portion of the data message 108 is received or a last portion of the data message 108 is received.

At block 506, the metrology driver 212 may validate the time sensitive information in the data message 108 to ensure that it is not corrupted. In various embodiments, the metrology driver 212 may calculate a checksum for the data message 108 to validate the information.

At block 508, the metrology driver 212 stores the time-stamped data message 108 in a temporary queue. Moreover, blocks 502 through 506 may be repeated for multiple different data messages 108 received from a single node and/or multiple different data messages 108 received from a plurality of nodes over a period of time. The metrology driver 212 may receive data messages from a plurality of nodes 102 in an embodiment where the non real-time processing system 110 is configured to partition the reception and processing of data messages 108 for different nodes. Thus, the temporary queue may accumulate multiple different timestamped data messages 108 at block 508. The temporary queue may be the data messaging queue 214 of FIG. 2.

At block 510, the metrology driver 212 exports the timestamped data messages 108 to a database. For example, the metrology driver 212 may receive an instruction from the metrology processing module 216 to view the temporary queue and/or empty the temporary queue. The metrology processing module 216 may issue the instruction in accordance with a scheduled event 222 handled by the transaction manager 220. The database may be the metrology database 218 of FIG. 2.

At block 512, the non real time processing system 110 processes the time sensitive information in the data messages 108 (which have been stored in the database) in a non real-time manner, such that the information is processed during a time interval that is after a time interval defined by the timestamps associated with the data messages 108. The example method 500 may then be repeated such that more data messages 108 are received and the temporary queue may be emptied multiple times.

Example Method of Prioritizing Activation of the Metrology Driver

Figure 6:
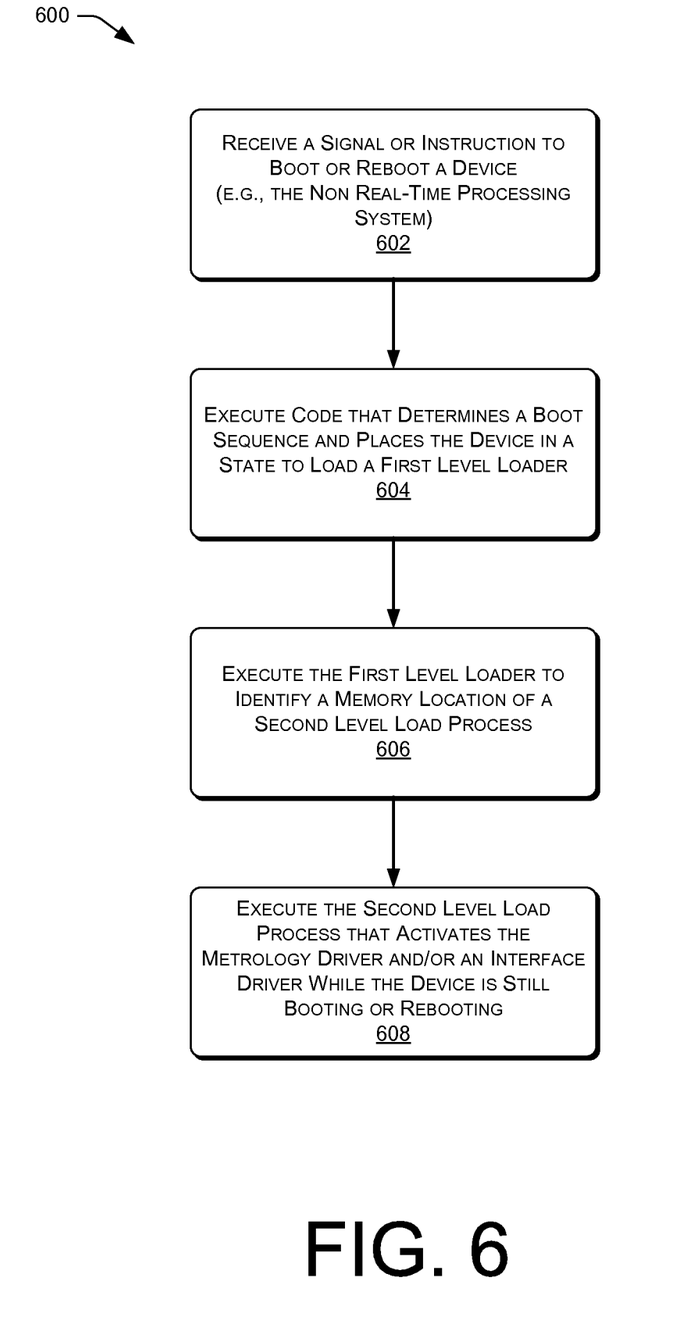
FIG. 6 is a flowchart illustrating an example method, which prioritizes the activation of a metrology driver so that data messages can be received during a bootup sequence or reboot sequence.

FIG. 6 illustrates an example method 600 of prioritizing activation of the metrology driver so it can receive data messages 108 during and following a boot or reboot operation. The method 600 is described with respect to the example Non Real-Time Processing System of FIG. 2. However, the method 500 is not limited to the embodiments or examples described with respect to FIG. 2 and may be implemented using other architectures and/or devices.

For purposes of this document, booting is an initial set of operations that a computing device or system performs when power to a processing unit is switched on or restored. Booting may also be initiated manually or automatically as a reboot process (e.g., after an update or reconfiguration is installed on the device). The booting process begins when the computing device is turned on for the first time or is re-energized after being turned off, and ends when the all the components of the computing device (particularly the operating system) are in an active state ready to perform normal operations. For various computers, a boot or reboot time may last tens of seconds and typically involves performing a power-on self-test, locating and initializing peripheral devices, and then finding, loading and starting an operating system.

As mentioned above, the metering systems 112 at nodes 102 may be sending data messages 108 that contain time sensitive information (e.g., the metrology data 126) every second or few seconds. Thus, during an entire boot or reboot period (e.g., ten to twenty seconds), the non real-time processing system 110 may be unable to reliably receive and/or store the data messages because the metrology driver 212 is not in an active state until after the boot or reboot period ends. Thus, the non real-time processing system 110 may lose valuable time sensitive information.

The method described herein prioritizes the activation of the metrology driver 212, as well as an interface (e.g., the UART serial interface), so that the non real-time processing system 110 can receive and store the data messages 108 even while the operating system 208 is still booting.

At block 602, a device (e.g., the non real-time processing system 110) receives a signal (e.g., power on) or instruction to boot or reboot. At block 604, the bootup module 226 first executes code that determines a boot sequence (e.g., an order in which internal components or peripheral components of the device are activated). This code may be stored in ROM. In various embodiments, the code that is first executed prioritizes loading the first level loader 228 which provides enough information to locate and load the second level loader 230 which knows how to prioritize loading the metrology driver 212 and/or an interface driver used by the metrology driver 212. The code prioritizes loading the first level loader 228 by ensuring that it is first, or early, in the boot sequence (e.g., before loading other kernel device components or peripheral components) and further by placing the device in a state so that the first level loader 228 can be loaded.

At block 606, the device executes the first level loader 228 to identify a memory location of the second level loader 230. In various embodiments, both the first level loader 228 and the second level loader 230 are stored in flash memory. At block 608, the device executes the second level loader 230. The second level loader 230 is configured to load the operating system kernel 210. However, the second level loader 230 initiates activation of the metrology driver 212 and/or an interface driver used by the metrology driver 212 before any other operating system kernel 210 components or drivers. Thus, the metrology driver 212 is active and able to receive and store the data messages 108 while the operating system 208 and the non real-time processing system 110 are still booting or rebooting. Moreover, results have shown that by prioritizing the activation of the metrology driver 212 in the boot sequence (via the boot code in ROM and the first level loader 228 and second level loader 230 in flash), the non real-time processing system 110 is able to reliably receive and store data messages 108 in less than five seconds after the signal or instruction to boot or reboot is received.

In various embodiments, the second level loader 230 may also implement other techniques to speed up the boot or reboot process. For example, the second level loader 230 may be configured to implement parallel error correction of flash memory block as they are loaded into RAM (e.g., external RAM) during the boot process. In another example, the second level loader 230 may remove part of a debugging process that slows down the boot or reboot process.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving an instruction to start an operating system for a metering data processing device;
   responsive to the instruction to start the operating system for the metering data processing device, executing first code to determine a boot sequence that prioritizes executing second code associated with initiating one or more components configured to receive and store unprocessed metrology data before executing third code associated with starting the operating system;
   responsive to or during execution of the first code, executing the second code to initiate the one or more components such that the metering data processing device is in an active state capable of receiving and storing the unprocessed metrology data, wherein the one or more components include at least a metrology driver configured to timestamp one or more messages upon receipt of a first portion of the one or more messages that includes the unprocessed metrology data before the boot sequence has been entirely completed, the first portion comprising less than all of the one or more messages;
   responsive to or during execution of the second code, executing the third code to start the operating system;
   identifying an unperformed event that was scheduled to be performed by the operating system at a time before the third code completed execution to start the operating system;
   identifying, based at least in part on timestamps of the one or more messages and the time at which the unperformed event was scheduled to be performed, a portion of the unprocessed metrology data included in the one or more messages that is required to perform the unperformed event; and
   responsive to completion of the executing of the third code to start the operating system, executing, by the operating system, the unperformed event using the portion of the unprocessed metrology data.

2. The method of claim 1, wherein the one or more components include at least an interface driver configured to receive the one or more messages that include the unprocessed metrology data before the boot sequence has been entirely completed.

3. The method of claim 2, wherein the interface driver is part of an operating system kernel.

4. The method of claim 1, wherein the metrology driver is part of an operating system kernel.

5. The method of claim 1, wherein the metering data processing device is in the active state receiving and storing the unprocessed metrology data while the boot sequence is still loading other device drivers.

6. The method of claim 1, wherein the first code is located in read only memory (ROM) and the second code is located in flash memory.

7. The method of claim 1, wherein executing the second code includes parallel error correction of memory blocks.

8. The method of claim 1, wherein the instruction to start the operating system comprises a signal to reboot or boot the metering data processing device.

9. The method of claim 1, wherein the metering data processing device is in the active state capable of receiving and storing the unprocessed metrology data in less than five seconds.

10. One or more non-transitory computer readable media storing instructions that, when executed by one or more processors, perform operations comprising:

receiving a signal to initiate a boot sequence for an operating system of a time sensitive data processing device;

executing boot sequence code that prioritizes execution of a first level load process before execution of the boot sequence to activate the operating system, the first level load process identifying a memory location of a second level load process associated with activating one or more drivers configured to receive and store time sensitive information;

executing the first level load process to identify the memory location of the second level load process;

executing the second level load process to activate the one or more drivers such that the time sensitive data processing device is capable of receiving and storing the time sensitive information for processing before the boot sequence is entirely completed, the one or more drivers including at least a metrology driver configured to timestamp one or more messages that include the time sensitive information before the boot sequence is entirely completed;

causing the metrology driver to timestamp the one or more messages upon receipt and store the one or more messages based at least in part on the timestamp and a node identification (ID), the node ID indicating a node that sent the time sensitive information;

responsive to or during execution of the second level load process, executing the boot sequence to activate the operating system;

identifying an unexecuted event that was scheduled to be executed by the operating system at a time prior to activation of the operating system;

identifying, based at least in part on timestamps of the one or more messages and the time prior to activation at which the unexecuted event was scheduled to be executed, a portion of the time sensitive information that is required for executing the unexecuted event;

causing the unexecuted event to be executed using the portion of the time sensitive information after the boot sequence has completely activated the operating system of the time sensitive data processing device.

11. One or more non-transitory computer readable media of claim 10, wherein the boot sequence code is stored in read only memory (ROM) and the first level load process and the second level load process are stored in flash memory.

12. One or more non-transitory computer readable media of claim 10, wherein the one or more drivers include at least an interface driver configured to receive one or more messages that include the time sensitive information before the boot sequence is entirely completed.

13. One or more non-transitory computer readable media of claim 10, wherein the one or more drivers are activated in less than five seconds.

14. A device comprising:

one or more processors;

memory storing a bootup module, executable by the one or more processors, that:

receives an instruction to boot or reboot the device;

responsive to receiving the instruction to boot or reboot the device, executes first code identifying a boot sequence that prioritizes executing second code associated with initiating one or more operating system components that receive and store time sensitive data, the one or more operating system components including a metrology driver; and         responsive to or during execution of the first code, executes the second code to initiate the one or more components such that the device is in an active state capable of receiving and storing the time sensitive data before the boot sequence is entirely completed;

the metrology driver, stored on the memory and executable by the one or more processors, that:

receives one or more messages that include the time sensitive data before the boot sequence is entirely completed;

timestamps the one or more messages upon receipt; and         stores the one or more messages in a data messaging queue; and     a transaction manager, stored on the memory and executable by the one or more processors, that:

determines one or more events scheduled to be executed at a particular time after the boot sequence is completed;

identifies, based at least in part on the timestamps of the one or more messages, a portion of the time sensitive data included in the one or more messages required to execute the one or more events; and         based at least in part on the one or more events scheduled to be executed at the particular time, sends a request to the metrology driver to move the one or more messages from the data messaging queue to a metrology database to be processed after the boot sequence is completed.

15. The device of claim 14, wherein the time sensitive data is metrology data received from one or more metering systems.

16. The device of claim 14, wherein the device is in the active state receiving and storing the time sensitive data while the boot sequence is still loading other drivers for an operating system of the device.

17. The device of claim 14, wherein the one or more components are in the active state in less than five seconds after receiving the instruction to boot or reboot the device.

18. The method of claim 1, further comprising processing the unprocessed metrology data after the boot sequence has been entirely completed based at least in part on the one or more timestamped messages.

19. The method of claim 1, wherein the metrology driver is further configured to timestamp the one or more messages upon receipt of the first portion of the one or more messages with a nanosecond of granularity.

20. The one or more non-transitory computer readable media of claim 10, wherein storing the one or more messages comprises storing the one or more messages in one or more data partitions of the time sensitive data processing device based at least in part on the node ID.

\* \* \* \* \*